United States Patent [19]

Samuels

[11] Patent Number: 5,027,272

[45] Date of Patent: Jun. 25, 1991

[54] METHOD AND APPARATUS FOR PERFORMING DOUBLE PRECISION VECTOR OPERATIONS ON A COPROCESSOR

[75] Inventor: Allen R. Samuels, San Jose, Calif.

[73] Assignee: Weitek Corporation, Sunnyvale, Calif.

[21] Appl. No.: 149,468

[22] Filed: Jan. 28, 1988

[51] Int. Cl.⁵ .............................................. G06F 15/16
[52] U.S. Cl. ................................. 364/200; 364/228.6; 364/228; 364/262
[58] Field of Search .................. 364/200 MS, 900 MS

[56] References Cited

U.S. PATENT DOCUMENTS

| | | | |
|---|---|---|---|
| 4,315,308 | 2/1982 | Jackson | 364/200 |
| 4,509,116 | 4/1985 | Lackey et al. | 364/200 |
| 4,636,942 | 1/1987 | Chan et al. | 364/200 |
| 4,661,900 | 4/1987 | Chan et al. | 364/200 |
| 4,679,166 | 7/1987 | Berger et al. | 364/900 |
| 4,745,547 | 5/1988 | Buchholz et al. | 364/200 |
| 4,777,613 | 10/1988 | Shahan et al. | 314/200 |
| 4,811,274 | 3/1989 | Cruess et al. | 364/900 |
| 4,821,231 | 4/1989 | Cruess et al. | 364/900 |

Primary Examiner—Gareth D. Shaw
Assistant Examiner—Kevin A. Kriess
Attorney, Agent, or Firm—Townsend and Townsend

[57] ABSTRACT

This invention relates to a system having a coprocessor being utilized by a processor for floating point double precision operations. The coprocessor utilizes one format for storing double precision data, the processor utilizes a second format for storing double precision data. The communication between the coprocessor and the processor limited to one half of a double precision data at a time. The processor utilizes a loop instruction to generate repetitive commands with incrementing source and destination addresses. Each command transfers data from a source address in the processor to a destination address in the coprocessor and may perform a double precision operation at the destination address. Each command also provides a double precision indication with the command.

7 Claims, 3 Drawing Sheets

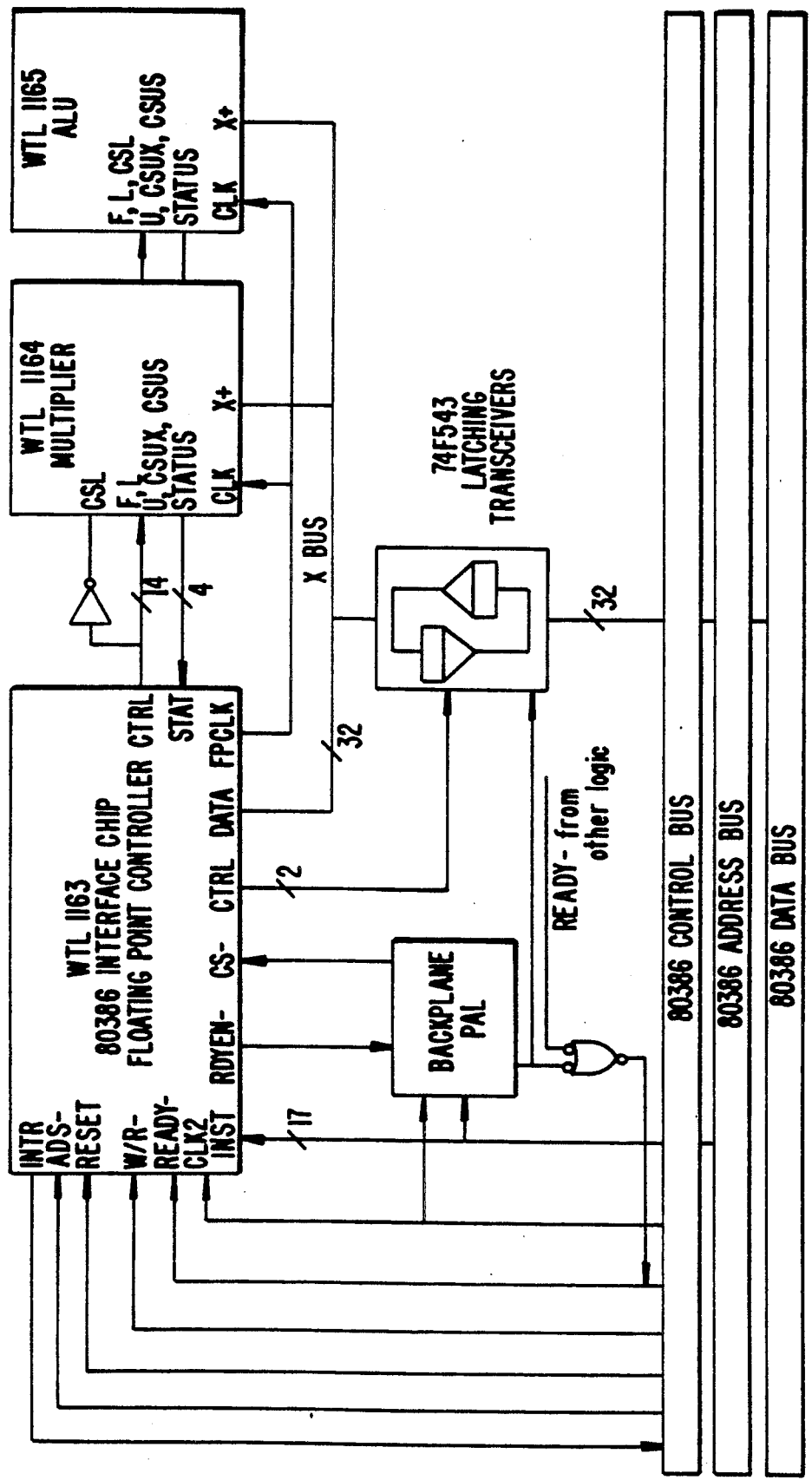
FIG._1.

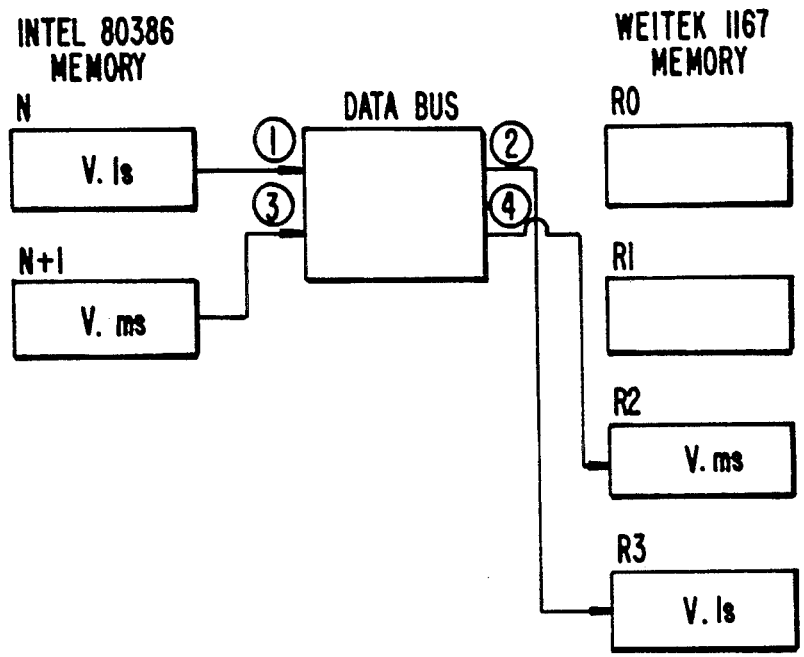
FIG._2.
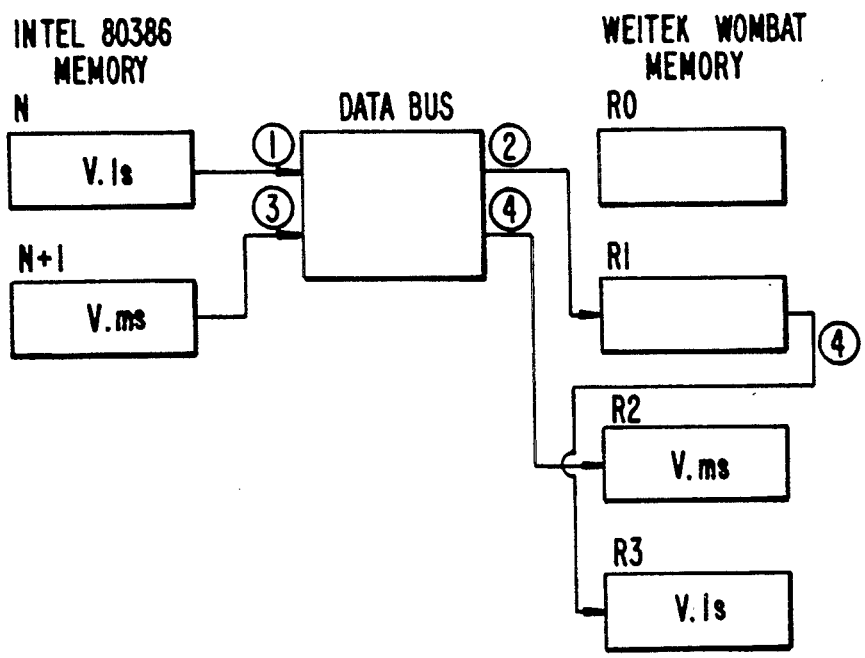
FIG._4.

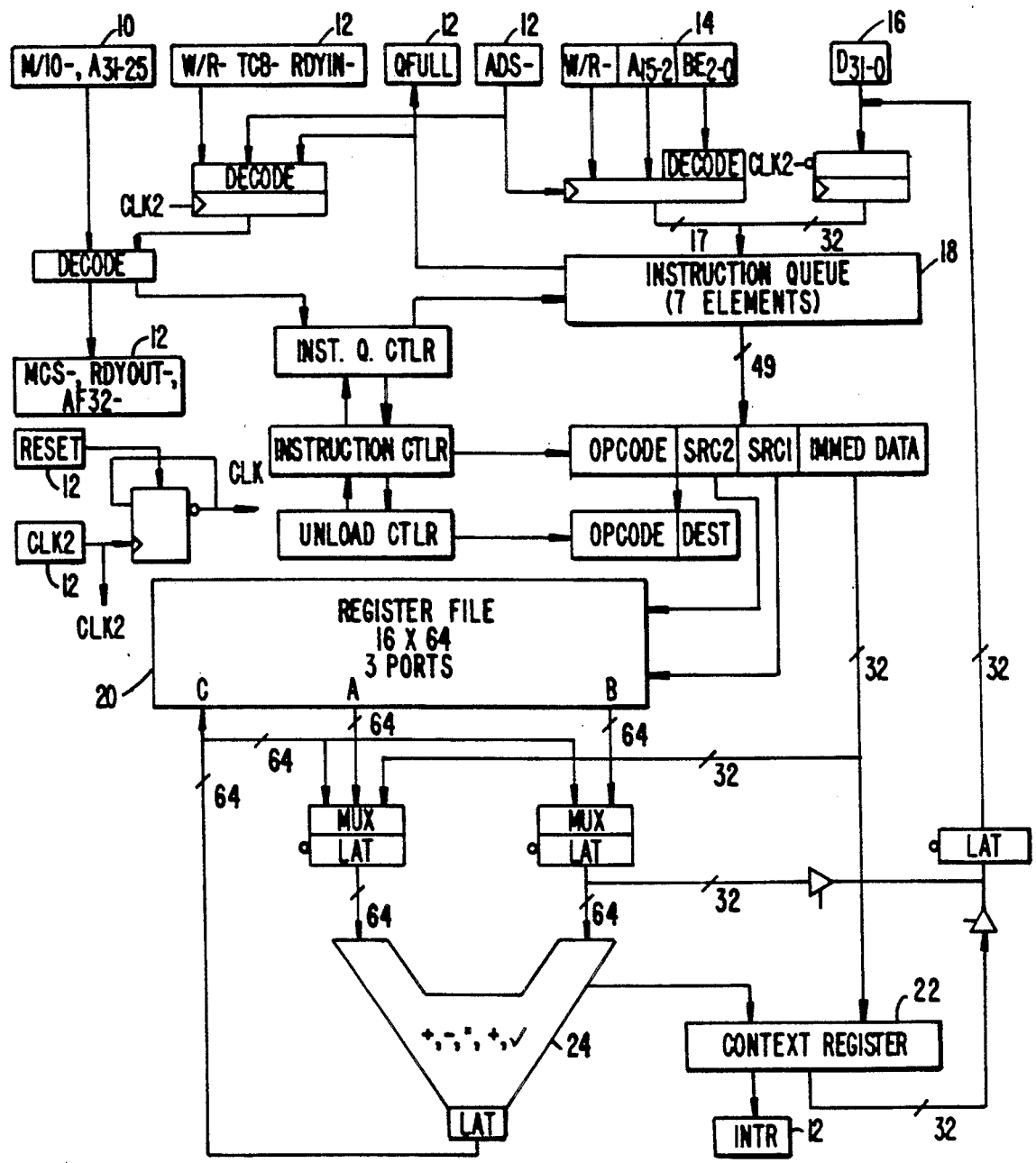
FIG._3.

METHOD AND APPARATUS FOR PERFORMING DOUBLE PRECISION VECTOR OPERATIONS ON A COPROCESSOR

The appendix contains six tables. Tables 1, 2, and 3 show the assembly code and the resulting commands that the Intel 80386 and the Weitek 1167 utilize in order to perform the double precision vector operation A=B*C. Tables 4, 5, and 6 show the assembly code and the resulting commands that the Intel 80386 and the Weitek WOMBAT utilize in order to perform the same double precision vector operation.

BACKGROUND OF THE INVENTION

This invention relates generally to a coprocessor and more particularly to a coprocessor resident in the memory map of a processor, the coprocessor being able to perform floating point operations on scalars and vectors for the processor.

A Weitek 1167 coprocessor has been utilized in the past to perform floating point operations for an Intel 80386 processor. The 80386 utilizes the 1167 because the 1167 is much faster at floating point operations than the 80386. However, the transfers of data between the 80386 and the 1167 is still limited by the speed of the 80386. As a result, any mechanism used to increase the speed of the interface between the 80386 and the 1167 will increase the overall speed of the 80386.

As shown in FIG. 1, the 1167 is a plug-in circuit board containing a Weitek 1163 controller, a Weitek 1164 multiplier, a Weitek 1165 arithmetic logic unit (ALU), and other logic circuitry. The 1167 can handle various types of floating point operations for the 80386 such as add, subtract, multiply, and divide. The 1167 can perform these floating point operations on scalars (32 bits), single precision vectors (each vector element contains 32 bits), and double precision vectors (each vector element contains 64 bits).

The 1167 resides in the memory map of the 0386. Instructions are passed from the 80386 to the 1167 by accessing particular addresses in the memory map of the 80386. Data is passed between the 80386 and the 1167 by passing the data to particular addresses in the memory map of the 80386. However, only 32 bits of data (or one half of a double precision vector element) can be transferred at a time.

The 1167 uses the Motorola format for storing double precision vectors within its registers. Each vector element is split into two halves, a most significant half and a least significant half. The least significant half is stored one register higher than the most significant half. For example, if the most significant half is stored at register R6, the least significant half is stored at register R7. In addition, the 1167 always stores the most significant half in an even register and the least significant half in an odd register. The Intel 80386 uses the Intel format for storing double precision data in its memory. The Intel format is opposite from the Motorola format. For example, if the least significant half is stored at address M, the most significant half is stored at address M+1.

As a result of the format for storing double precision vectors, a double precision command with an odd destination register is an invalid 1167 instruction. Such a command would point to the middle of a double precision element resulting in an meaningless operation.

The 80386 has the ability to use block move instructions to command the 1167 to perform floating point operations on single precision vectors. The 80386 block move instructions are in assembly language and are converted by the 80386 into repetitive commands with incrementing source and destination addresses to be sent to the 1167. The 80386, as well as other processors, is able to convert block move instructions into 1167 commands faster than it can convert other nonrepetitive move instructions into 1167 commands. Hence, block move commands increase the speed of the 80386 to 1167 interface, yielding higher computational rates and greater efficiency. The 80386 converts a block move instruction from assembly language to a series of repetitive commands with incrementing source and destination addresses. There is one command per single precision vector element. Each command transfers the corresponding vector element between the 80386 and the 1167 and then performs a task with that element such as load, multiply, add, or store from the source address to the destination address.

However, the 80386 cannot use the block move instructions to command the 1167 to perform floating point operations on double precision vectors. One reason is because the double precision vectors can be transferred only one half of a vector element at a time. A complete vector element must be transferred before a vector operation can validly be performed on it, whereas every command created by block move instruction performs a vector operation on its corresponding half vector element. A second reason is because the 80386 and the 1167 use different formats for storing double precision vectors. A double precision vector being transferred must have each vector element reversed in order. A third reason is the restriction that a double precision vector must not have an odd destination register. As a result of these restrictions, the greater efficiencies of the block move instructions are not utilized for double precision floating point operations.

SUMMARY OF THE INVENTION

This invention relates to a system having a coprocessor being utilized by a processor for floating point double precision operations. The coprocessor utilizes one format for storing double precision data, the processor utilizes a second format for storing double precision data. The communication between the coprocessor and the processor limited to one half of a double precision datum at a time. The processor utilizes a loop instruction to generate repetitive commands with incrementing source and destination addresses. Each command transfers data from a source address in the processor to a destination address in the coprocessor and may perform a double precision operation at the destination address. Each command also provides a double precision indication with the command.

When the source is the processor and the destination is the coprocessor, the coprocessor converts, interprets, and executes the commands. In response to the double precision indication, every other command starting with the first command is converted into a single precision load command with the destination address being a temporary register in the coprocessor. Also in response to the double precision indication, every other command starting with the second command is interpreted as a double precision operation command with the double precision data being stored in the second format at both the source address and the temporary register.

When the source is the coprocessor and the destination is the processor, the coprocessor converts and executes the commands. In response to the double precision indication, every command starting with the first command is converted into a single precision store command with the source address referencing the other half of the double precision data.

The invention has several differences from the prior art, some at which are described below. One difference is that the invention is contained on one chip as opposed to several chips plus logic circuitry as shown in FIG. 1 for the 1167. A second difference is that the invention has additional instructions in its instruction set such as the LOAD.D and STORE.D instructions. A third difference is that a double precision instruction with an odd destination register was invalid 1167 instruction, whereas the instruction is converted into a single precision instruction by the invention. A fourth difference is that the invention contains an endian mode switch so that the coprocessor can be converted from the Motorola to the Intel format for storing double precision data or vice versa.

As a result of these differences, the combination of the processor and coprocessor is capable of utilizing the block move instructions for performing double precision vector operations. This results in greater efficiency due to reduced overhead yielding greater computational rates. In addition, the endian mode switch allows the coprocessor to be adaptable to processors utilizing either the Motorola or Intel formats for handling double precision vector operations.

BRIEF DESCRIPTION OF THE DRAWINGS

FIG. 1 is a block diagram of the Weitek 1167.

FIG. 2 is a block diagram showing a transfer of a double precision vector one element long from an Intel 80386 to the Weitek 1167.

FIG. 3 is a detailed diagram of the Weitek WOMBAT.

FIG. 4 is a block diagram showing a transfer of a double precision vector one element long from an Intel 80386 to the Weitek WOMBAT.

DETAILED DESCRIPTION OF THE PREFERRED EMBODIMENT

FIG. 1 shows the Weitek 1167 coprocessor. The 1167 is a plug-in circuit board containing a Weitek 1163 controller, a Weitek 1164 multiplier, a Weitek 1165 arithmetic logic unit (ALU), and other miscellaneous logic circuitry. The 1163 contains a register file with 1024 bits. The register file is organized into 32 data registers, named R0 through R31, each register containing 32 bits. The 1163 also contains a context register containing a set of bits that are used as logical switches. Communication occurs between the 1167 and the 80386 by three buses: a control bus, an address bus, and a data bus. Control signals are transferred between the 80386 and the 1167 on the control bus. The 80386 transfers commands to the 1167 on the address bus. Data is transferred between the 80386 and the 1167 on the data bus. For purposes of data transfer, the data bus is sometimes referred to as register R0.

The Weitek WOMBAT has the same general structure as the 1167 shown in FIG. 1. However, the WOMBAT is entirely contained on a single semiconductor chip.

FIG. 2 shows the transferring of a double precision vector one element long from the memory of the Intel 80386 to the data registers of the Weitek 1167. In the first step, the 80386 loads the least significant half of the double precision vector element onto the data bus. In the second step, the 1167 transfers the element half from the data bus to register R3. In the third step, the 80386 loads the most significant half of the double precision vector element onto the data bus. In the fourth step, the 1167 transfers the element half from the data bus to register R2. These steps result in a double precision vector one element long being transferred from the memory of the 80386 in the Intel format to the data registers of the 1167 in the Motorola format.

Tables 1, 2, and 3 (see appendix) show the assembly code and the resulting commands that the Intel 80386 and the Weitek 1167 utilize in order to perform the double precision vector operation A=B*C. The instructions enclosed in < > are shorthand for the actual instruction sent to the 1167. The vectors A, B, and C are two elements long in this example.

Table 1 shows the assembly code used by the 80386, the commands sent from the 80386 to the 1167, and the commands the 1167 executes, in order to transfer the double precision vector B from the memory of the 80386 to the data registers of the 1167. The assembly code consists of a series of move instructions. These instructions are converted by the 80386 into a series of single precision load commands for the 1167 (the .S in LOAD.S refers to single precision). Each load command moves an element half from the 80386 to the 1167. Note that there are four assembly instructions for each vector element to be transferred.

Table 2 shows the assembly code used by the 80386, the commands sent from the 80386 to the 1167, and the commands the 1167 executes, in order to multiply the double precision vector C from the memory of the 80386 into the double precision vector B in the data registers of the 1167. The assembly code consists of a series of move instructions. These instructions are converted by the 80386 into a series of single precision load and double precision multiply commands (the .D in MUL.D refers to double precision) for the 1167. Each load command moves an element half from the data bus (referred to as R0) to the register R1. Each multiply command multiplies the C element located in the data bus and R1 into the appropriate B element resulting in an A element. Note that there are four assembly instructions for each vector element to be transferred and multiplied.

Table 3 shows the assembly code used by the 80386, the commands sent from the 80386 to the 1167, and the commands the 1167 executes, in order to transfer the double precision vector A from the data registers of the 1167 to the memory of the 80386. The assembly code consists of a series of move instructions. These instructions are converted by the 80386 into a series of single precision store commands for the 1167. Each store command moves an element half from the 1167 to the 80386. Note that there are four assembly instructions for each vector element to be transferred.

FIG. 3 shows a detailed block diagram of the Weitek WOMBAT. The WOMBAT communicates with the Intel 80386 through a control bus, an address bus, and a data bus. The 80386 addresses the WOMBAT through the chip select bits 10 from the address bus. The WOMBAT and the 80386 also pass control signals between each other through the control bits 12 from the control bus. The 80386 passes instructions to the WOMBAT on the low order bits 14 of the address bus. Data is transferred between the 80386 and the WOMBAT on the data bus 16 which is sometimes referred to as R0. The WOMBAT also contains an instruction queue 18 which holds incoming instructions for future execution. The register file 20 is the memory of the WOMBAT and is defined as a series of 32-bit registers R0 through R31. The context register 22 contains a series of switches including an endian mode switch. The endian mode switch is used to change the format used by the WOMBAT from Motorola to Intel or vice versa. The WOMBAT also includes an operator 24, which performs mathematic operations on the data stored in the registers. The WOMBAT has three 64 bit data buses for internal communication between the operator 24 and the register file 20.

FIG. 4 shows the transferring of a double precision vector one element long from the Intel 80386 to the Weitek WOMBAT. In the first step, the 80386 loads the least significant half of the double precision vector element onto the data bus. In the second step, the WOMBAT transfers the element half from the data bus to register R1. In the third step, the 80386 loads the most significant half of the double precision vector element onto the data bus. In the fourth step, the WOMBAT transfers both of the element halves from the data bus and R1 to registers R2 and R3. These steps result in a double precision vector one element long being transferred from the memory of the 80386 in the Intel format to the data registers of the WOMBAT in the Motorola format.

Tables 4, 5, and 6 (see appendix) show the assembly code and the resulting commands that the Intel 80386 and the Weitek WOMBAT utilize in order to perform the double precision vector operation A=B*C. The instructions enclosed in < > are shorthand for the actual instructions sent to the WOMBAT. The vectors A, B, and C are two elements long in this example.

Table 4 shows the assembly code used by the 80386, the commands sent from the 80386 to the WOMBAT, and the commands the WOMBAT executes, in order to transfer the double precision vector B from the memory of the 80386 to the data registers of the WOMBAT. The assembly code consists of a vector length instruction, a vector source address instruction, and a vector destination address instruction, and a block move instruction. These instructions are converted by the 80386 into a series of double precision load commands for the WOMBAT. The WOMBAT converts every other load command, starting with the first, into single precision load commands with a destination of register R1. Each single precision load command moves an element half from the 80386 to the register R1 in the WOMBAT. Each double precision load command moves an element from the data bus (referred to as R0) and R1 into the appropriate registers. Note that the 80386 requires only four assembly instructions to perform this function. Also note that the 80386 can perform this function for vectors with more elements while still requiring only four assembly instructions.

Table 5 shows the assembly code used by the 80386, the commands sent from the 80386 to the WOMBAT, and the commands the WOMBAT executes, in order to multiply the double precision vector C from the memory of the 80386 into the double precision vector B in the data registers of the WOMBAT. The assembly code consists of a vector length instruction, a vector source address instruction, a vector destination address instruction, and a block move instruction. These instructions are converted by the 80386 into a series of double precision multiply commands for the WOMBAT. The WOMBAT converts every other load command, starting with the first, into single precision load commands with a destination of register R1. Each load command moves an element half from the data bus to the register R1. Each multiply command multiplies the C element located in the data bus (referred to as R0) and R1 into the appropriate B element resulting in an A element. Note that the 80386 requires only four assembly instructions to perform this function. Also note that the 80386 can perform this function for vectors with more elements while still requiring only four assembly instructions.

Table 6 shows the assembly code used by the 80386, the commands sent from the 80386 to the WOMBAT, and the commands the WOMBAT executes, in order to transfer the double precision vector A from the data registers of the WOMBAT to the memory of the 80386. The assembly code consists of a vector length instruction, a vector source address instruction, a vector destination address instruction, and a block move instruction. These instructions are converted by the 80386 into a series of double precision store commands for the WOMBAT. The WOMBAT converts every store command into single precision store commands with a source of the register containing the other half of the referenced element. Each store command moves an element half from the WOMBAT to the 80386. Note that the 80386 requires only four instructions to perform this function. Also note that the 80386 can perform this function for vectors with more elements while still requiring only four assembly instructions.

APPENDIX

TABLE 1

Transfer a double precision vector B
from the 80386 memory into the 1167 register file.

The assembler instructions executed by the 80386:

| 80386 Instruction | Notes |
|---|---|
| MOV EAX,B | Source Address |
| MOV <LOAD.S R3,R0>,EAX | Destination Address |
| MOV EAX,B+4 | Source Address |
| MOV <LOAD.S R2,R0>,EAX | Destination Address |
| MOV EAX,B+8 | Source Address |
| MOV <LOAD.S R5,R0>,EAX | Destination Address |
| MOV EAX,B+12 | Source Address |
| MOV <LOAD.S R4,R0>,EAX | Destination Address |

The sequence of 1167 commands generated by these instructions are:

| Data on Data Bus | Command on Address Bus | Actual 1167 Command | Notes |
|---|---|---|---|
| B[0].ls | LOAD.S R3,R0 | LOAD.S R3,R0 | data bus→R3 |
| B[0].ms | LOAD.S R2,R0 | LOAD.S R2,R0 | data bus→R2 |
| B[1].ls | LOAD.S R5,R0 | LOAD.S R5,R0 | data bus→R5 |
| B[1].ms | LOAD.S R4,R0 | LOAD.S R4,R0 | data bus→R4 |

TABLE 2

Multiply a double precision vector C
from the 80386 memory into the double precision
vector B located in the 1167 register file creating
a double precision vector A = B * C.

The assembler instructions executed by

TABLE 2-continued

Multiply a double precision vector C
from the 80386 memory into the double precision
vector B located in the 1167 register file creating
a double precision vector A = B * C.

The assembler instructions executed by
the 80386:

| 80386 Instruction | Notes |
|---|---|
| MOV EAX,C | Source Address |
| MOV <LOAD.S R1,R0>,EAX | Destination Address |
| MOV EAX,C+4 | Source Address |
| MOV <MUL.D R2,R0>,EAX | Destination Address |
| MOV EAX,C+8 | Source Address |
| MOV <LOAD.S R1,R0>,EAX | Destination Address |
| MOV EAX,C+10 | Source Address |
| MOV <MUL.D R4,R0>,EAX | Destination Address |

The sequence of 1167 commands generated by
these instructions are:

| Data on Data Bus | Command on Address Bus | Actual 1167 Command | Notes |
|---|---|---|---|
| C[0].ls | LOAD.S R1,R0 | LOAD.S R1,R0 | data bus→R1 |
| C[0].ms | MUL.D R2,R0 | MUL.D R2,R0 | data bus·R1×R2·R3→R2·R3 |
| C[1].ls | LOAD.S R1,R0 | LOAD.S R1,R0 | data bus→R1 |
| C[1].ms | MUL.D R4,R0 | MUL.D R4,R0 | data bus·R1×R4·R5→R4·R5 |

TABLE 3

Transfer the double precision vector A
from the 1167 register file into the 80386 memory.

The assembler instructions executed by
the 80386:

| 80386 Instruction | Notes |
|---|---|
| MOV EAX, <STORE.S R3,R0> | Source Address |
| MOV A,EAX | Destination Address |
| MOV EAX, <STORE.S R2,R0> | Source Address |
| MOV A+4,EAX | Destination Address |
| MOV EAX, <STORE.S R5,R0> | Source Address |
| MOV A+8,EAX | Destination Address |
| MOV EAX, <STORE.S R4,R0> | Source Address |
| MOV A+12,EAX | Destination Address |

The sequence of 1167 commands generated by
these instructions are:

| Data on Data Bus | Command on Address Bus | Actual 1167 Command | Notes |
|---|---|---|---|
| R3 | STORE.S R3 | STORE.S R3 | R3→A[0].ls (data bus) |
| R2 | STORE.S R2 | STORE.S R2 | R2→A[0].ms (data bus) |
| R5 | STORE.S R5 | STORE.S R5 | R5→A[1].ls (data bus) |
| R4 | STORE.S R4 | STORE.S R4 | R4→A[1].ms (data bus) |

TABLE 4

Transfer a double precision vector B
from the 80386 memory into the 1167 register file.

The assembler instructions executed by
the 80386:

| 80386 Instruction | | Notes |
|---|---|---|
| MOV | ECX,4 | Length of Vector (in 32-bit half elements) |
| LEA | ESI,B | Source Address |
| LEA | EDI, <LOAD.D R1,R0> | Destination Address |
| REP MOVSD | | Move the Vector |

The sequence of WOMBAT commands generated by
these instructions are:

| Data on Data Bus | Command on Address Bus | Actual WOMBAT Command | Notes |
|---|---|---|---|
| B[0].ls | LOAD.D R1,R0 | LOAD.S R1,R0 | data bus→R1 |
| B[0].ms | LOAD.D R2,R0 | LOAD.D R2,R0 | data bus·R1→R2·R3 |
| B[1].ls | LOAD.D R3,R0 | LOAD.S R1,R0 | data bus→R1 |
| B[1].ms | LOAD.D R4,R0 | LOAD.D R4,R0 | data bus·R1→R4·R5 |

TABLE 5

Multiply a double precision vector C
from the 80386 memory into the double precision
vector B located in the WOMBAT register file creating
a double precision vector A = B * C.

The assembler instructions executed by
the 80386:

| 80386 Instruction | | Notes |
|---|---|---|
| MOV | ECX,4 | Length of Vector (in 32-bit half elements) |
| LEA | ESI,C | Source Address |

TABLE 5-continued

Multiply a double precision vector C
from the 80386 memory into the double precision
vector B located in the WOMBAT register file creating
a double precision vector A = B * C.

| LEA | | EDI, <MUL.D R1,R0> | Destination Address |
|---|---|---|---|
| REP MOVSD | | | Move the Vector |

The sequence of WOMBAT commands generated by
these instructions are:

| Data on Data Bus | Command on Address Bus | Actual WOMBAT Command | Notes |
|---|---|---|---|
| C[0].ls | MUL.D R1,R0 | LOAD.S R1,R0 | data bus→R1 |
| C[0].ms | MUL.D R2,R0 | MUL.D R2,R0 | data bus·R1×R2·R3→R2·R3 |
| C[1].ls | MUL.D R3,R0 | LOAD.S R1,R0 | data bus→R1 |
| C[1].ms | MUL.D R4,R0 | MUL.D R4,R0 | data bus·R1×R4·R5→R4·R5 |

TABLE 6

Transfer the double precision vector A
from the 1167 register file into the 80386 memory.

The assembler instructions executed by
the 80386:

| 80386 Instruction | | Notes |
|---|---|---|
| MOV | ECX,4 | Length of Vector (in 32-bit half elements) |
| LEA | ESI, <STORE.D R2> | Source Address |
| LEA | EDI,A | Destination Address |
| REP MOVSD | | Move the Vector |

The sequence of WOMBAT commands generated by
these instructions are:

| Data on Data Bus | Command on Address Bus | Actual WOMBAT Command | Notes |
|---|---|---|---|
| R3 | STORE.D R2 | STORE.S R3 | R3→A[0].ls (data bus) |
| R2 | STORE.D R3 | STORE.S R2 | R2→A[0].ms (data bus) |
| R5 | STORE.D R4 | STORE.S R5 | R5→A[1].ls (data bus) |
| R4 | STORE.D R5 | STORE.S R4 | R4→A[1].ms (data bus) |

What is claimed is:

1. In a coprocessor being utilized by a processor, the coprocessor utilizing one format for storing double precision data, the processor utilizing a second format for storing double precision data, the communication between the coprocessor and the processor over a data bus limited to one half of a double precision operand at a time, the processor utilizing a loop instruction to generate repetitive commands with incrementing source and destination addresses on an address bus between the processor and the coprocessor, each said repetitive command being for performing a double precision operation on a double precision operands from said source and destination addresses, respectively, and storing the result at the destination address, each said repetitive command providing a double precision indication with the repetitive command, a method of the coprocessor responding to said repetitive commands received from the processor with incrementing source and destination addresses comprising the steps of:

(a) said coprocessor ignoring, in response to the double precision indication, every other said repetitive command starting with the first command and instead loading a half of a double precision operand on the data bus into a temporary register in the coprocessor;

(b) said coprocessor interpreting, in response to the double precision indication, every other said repetitive command starting with the second command as a double precision operation command with one of the double precision operands in the second format having one half on the data bus and the other half in said temporary register; and (c) said coprocessor executing said double precision operation command.

2. In a coprocessor being utilized by a processor, the coprocessor utilizing one format for storing double precision data, the processor utilizing a second format for storing double precision data, the communication between the coprocessor and the processor over a data bus limited to one half of a double precision operand at a time, the processor utilizing a loop instruction to generate repetitive commands with incrementing source and destination addresses, each said repetitive command being for transferring data from a source address in the coprocessor to a destination address in the processor, each said repetitive command providing a double precision indication with the repetitive command, a method of the coprocessor performing the repetitive commands received from the processor with incrementing source and destination addresses comprising the steps of:

(a) said coprocessor converting, in response to the double precision indication, a received source address in every repetitive command starting with the first command to a second source address referencing the other half of a double precision operand which has a half stored at said received source address; and (b) said coprocessor placing a double precision operand half at said second source address on said data bus.

3. In a coprocessor being utilized by a processor system, the coprocessor utilizing one format for storing double precision data, the processor utilizing a second format for storing double precision data, the communication between the coprocessor and the processor over a data bus limited to one half of a double precision operand at a time, the processor utilizing a loop instruction to generate repetitive commands with incrementing source and destination addresses on an address bus between the processor and coprocessor, each said repetitive command being for performing a double precision operation on double precision operands from said source and destination addresses and storing the result at the destination address, each said repetitive command providing a double precision indication with the command, an improved coprocessor means for responding to said repetitive commands with incrementing source and destination addresses comprising:

(a) first coprocessor means for ignoring, in response to the double precision indication, every other said repetitive command starting with the first command and instead loading a half of a double precision operand on the data bus into a temporary register int he coprocessor;

(b) second coprocessor means for interpreting, in response to the double precision indication, every other said repetitive command starting with the second command as a double precision operation command with one of the double precision operands in the second format having one half on the data bus and the other half in said temporary register; and (c) third coprocessor means for executing said double precision operation command.

4. The coprocessor of claim 3 wherein said coprocessor further comprises a switch for changing the format for storing double precision data.

5. The coprocessor of claim 3 being on a single semiconductor chip wherein said coprocessor further comprises at least one internal 64 bit bus for transferring data between internal logic and memory units.

6. In a coprocessor being utilized by a processor, the coprocessor utilizing one format for storing double precision data, the processor utilizing a second format for storing double precision data, the communication between the coprocessor and the processor over a data bus limited to one half of a double precision operand at a time, the processor utilizing a loop instruction to generate repetitive commands with incrementing source and destination addresses, each said repetitive command being for transferring data from a source address in the coprocessor to a destination address in the processor, each said repetitive command providing a double precision indication with the command, an improved coprocessor means for performing the repetitive commands with incrementing source and destination addresses comprising:

(a) first coprocessor means for converting, in response to the double precision indication, a received source address in every said repetitive command starting with the first command to a second source address referencing the other half of a double precision operand which has a half stored at said received source address; and (b) second coprocessor means for placing a half of the double precision operand at said second source address on said data bus.

7. The coprocessor of claim 6 wherein said coprocessor further comprises a switch for changing the format for storing double precision data.

* * * * *